Jan. 14, 1969  F. E. CONN  3,421,533
FLOW DIVIDER VALVE ASSEMBLY INSENSITIVE TO
DISCHARGE PRESSURE
Filed Dec. 30, 1965
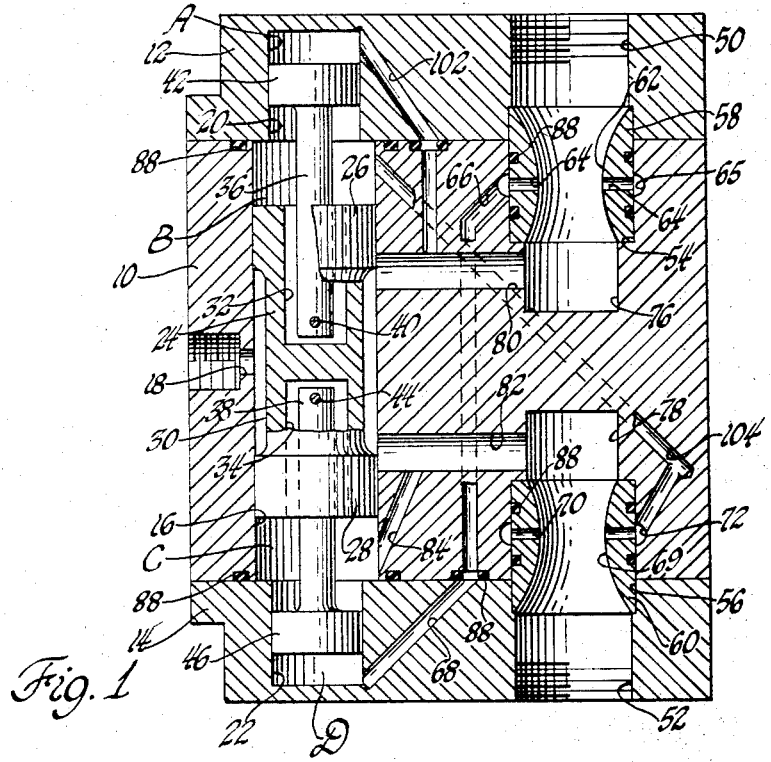
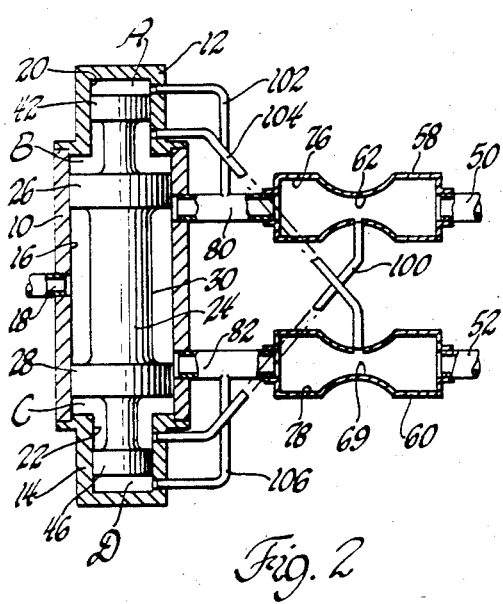
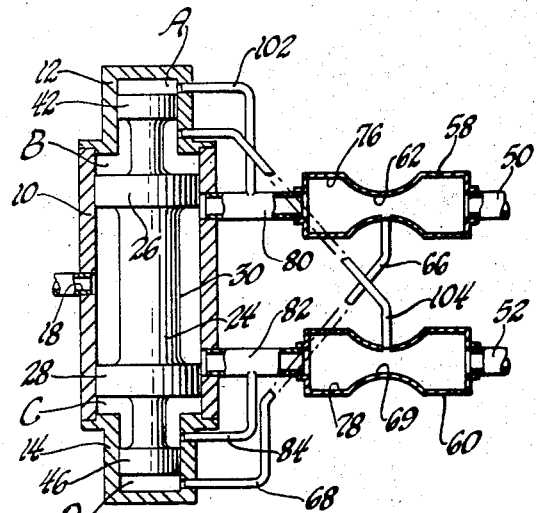
INVENTOR.
Francis E. Conn
BY
George E. Johnson
ATTORNEY United States Patent Office 3,421,533
Patented Jan. 14, 1969

3,421,533
FLOW DIVIDER VALVE ASSEMBLY INSENSITIVE TO DISCHARGE PRESSURE
Francis Edward Conn, Plainfield, Ind., assignor to General Motors Corporation, Detroit, Mich., a corporation of Delaware
Filed Dec. 30, 1965, Ser. No. 517,724
U.S. Cl. 137—101    3 Claims
Int. Cl. G05d *11/03;* F17d *3/00*

ABSTRACT OF THE DISCLOSURE

A valve assembly hydraulically balanced to divide a single inlet fluid flow between two outlets at preselected proportions with a minimum pressure loss and independent of discharge pressures.

---

The invention described herein was made in the course of, or under, a contract with the United States Atomic Energy Commission.

State of prior art

Lewis 2,971,522—This patent discloses a proportioning valve assembly in which a spool valve rotationally "dithers" giving ease of operation—i.e. a reduction in friction between a slidable spool valve and a cylinder wall of a valve body member. Restrictive orifices 62 and 64 place definite limitations on the effectiveness of operation and the flow capacity of the assembly.

Bowers et al. 2,985,184—This patent discloses a proportioning valve assembly in which supplementary restricted passages are used to increase the range of flow rates. These restricted passages inherently cause a loss in pressure which is not recovered.

Description of the invention

In the drawings:
FIGURE 1 is a sectional view through a valve assembly presenting a preferred embodiment of the present invention;
FIGURE 2 is a diagrammatic and cross-sectional representation of a valve assembly similar to that of FIGURE 1 but which includes symmetrical connections; and
FIGURE 3 is a diagrammatic view having the asymmetrical connections of FIGURE 1.

Flow divider valve assemblies are useful in several fields for dividing a single input flow between two outlets at selected proportions. By way of example, dual engine fuel systems often obtain fuel from a common pump. Another example is the distribution of pressure fluid to a pair of hydraulic lift cylinders in lifting a heavy table uniformly at spaced points.

In gaining maximum effectiveness in operation, it has been discovered that by the use of the present invention the dividing of fluid flow need not be accompanied to any substantial extent by a retardation or restriction in the flow of the fluid but may be characterized by pressure or substantially full volume flow recovery.

In FIGURE 1, a main valve body block is shown at 10 and to the opposite ends of which are affixed end blocks 12 and 14 by bolts not shown. A spool valve bore 16 is formed in the block 10 and with which an inlet port 18 communicates. Coaxial with the bore 16 and formed in the end blocks 12 and 14 are two bores 20 and 22 respectively and of smaller diameter. These bores terminate short of passing through the blocks 12 and 14. Slidable in the bore 16 is a spool valve 24 having lands 26 and 28 at opposite ends. These lands are spaced by annular groove 30. Opposite ends of the spool valve 24 are bored as at 32 and 34 freely to receive rods 36 and 38 respectively. The rod 36 is fixed to the spool valve 24 by a pin 40 and the other end of that rod is made integral with a plunger head or piston 42 slidable in the bore 20. The rod 38 is similarly fitted with a pin 44 and a plunger head or piston 46, the latter being slidable in the bore 22.

Two outlets 50 and 52 are formed in the end blocks 12 and 14 respectively. Each is enlarged as at 54 and 56 in an end block and continues in the main block 10 to retain venturi throat members 58 and 60. The venturi throat 62 of FIGURES 1 and 3 is connected by passages 64, 65 and line 66, 68 to the closed end of bore 22 whereas the venturi throat 62 of FIGURE 2 is connected by a line 100 to the bore but at the other side of the head 46. Each outlet 50 or 52 terminates in the block 10 with a reduced diameter recess 76 or 78. The recess 76 in all figures is connected to the bore 16 by a passage 80 controlled by the land 26 and also by a passage or line 102 to the closed end of the bore 20. The throat 69 in all figures is connected by a passage or line 104 to the bore 20 at the other side of the head 42 from the line 102. In the detail view of FIGURE 1, passages 70 and 72 are in series with the line 104. The recess 78 in all figures is connected by a passage or line 82 to the bore 16 and is controlled by the land 28. In FIGURES 1 and 3 the passage or line 82 is connected by a passage or line 84 to the bore 22 but in FIGURE 2 a line 106 connects the line 82 to the closed end of the bore 22.

O-rings 88 are utilized between each of the end blocks 12 and 14 and the main block 10 to prevent leakage from the bores and passages. Such rings are also used to insure proper sealing of the venturi members 58 and 60.

For convenience in describing the operation, the separate zones in the bores 20, 16 and 22 are partially defined by the plunger heads 42, 46 and the spool valve lands 26 and 28 may be called zones A, B, C, and D. The pressure in the passage 80 exists in the zone A (FIGURES 2 and 3). The pressure in the throat 62 exists in the zone C (FIGURE 2) and D (FIGURE 3). The pressure in the throat 69 is transferred to the zone B (FIGURES 2 and 3) and the pressure of passage 82 is found in the zone D (FIGURE 2) and C (FIGURE 3).

To aid in presenting the operation reference is now first made to FIGURE 2 wherein the critical areas and the connections are symmetrical and equivalent parts and passages are given the same reference numbers as used in FIGURES 1 and 3, but changed connections are lines 100 and 106 as above indicated. FIGURE 2 shows a satisfactorily operative arrangement for any design flow division but this arrangement is dependent upon an exact two-to-one relationship between the spool and plunger head areas in order to be independent of absolute pressure levels at the load. For equal flow division, then, the effective area of the chambers B and C is the same as the effective area of the chambers A and D.

In operation of the FIGURE 2 symmetrical arrangement, a source flow through port 18 is distributed to the two lines 80 and 82 across the metering lands 26 and 28. To gain the preselected proportions, the flow in each line 80 and 82 is sensed by the venturi 58 and 60 respectively. A force is applied to the spool valve 24 in accordance with any existing error in the proportions. The sum of the discharge flows through lines 80 and 82 must equal the flow through the inlet port 18, so any deviation from the preselected proportions produces corrective differential pressures in both venturi. These are resolved into a net controlling and correcting force on the spool valve 24 because of the connections to the chambers A, B, C and D.

If the back pressures of outlet 50 (FIGURE 2) is increased, the flow in that outlet will diminish and cause an increase in flow through the outlet 52. Despite the increase in pressure at 50, the differential pressure between that of line 80 and the throat 62 is decreased. The net downward force on the spool valve 24 from the chambers A and D is reduced. At the same time, the net upward force in chambers B and C is increased compelling the spool valve 24 to move upwardly increasing the metering area to the outlet 50. The pressure drops in chambers A and D and chambers B and C will become balanced and the spool valve 24 will cease movement as the proper proportions of flow are reached. If, due to manufacturing tolerances, the effective area of zone A is not exactly equal to the effective area of zone B, then the flow division ratio will change slightly with variations in the two discharge pressures in lines 50 and 52.

In order to avoid the necessity of observing critical manufacturing tolerances while retaining a preselected flow proportion insensitive to discharge pressures, the asymmetrical connections of FIGURES 1 and 3 are preferred. With such connections, only the differential pressure of each venturi is resolved into a net controlling force on the spool valve 24. With either form of connections, the venturi do not serve to reduce the flow capacity of the valve assembly.

I claim:

1. A flow divider valve assembly comprising a valve body having a main bore and two smaller bores axially aligned therewith, one of said smaller bores located axially outwardly of one end of said main bore and the other of said smaller bores located axially outwardly of the other end of said main bore, an inlet passage and two outlet passages communicating with said main bore, a spool valve slidable in said main bore and having axially spaced, radially extending lands at opposite sides of said inlet passage, one of said lands being located to partially overlap the entrance to one of said outlet passages and the other of said lands being located to partially overlap the entrance to the other of said outlet passages to control flow from said inlet passage around the central portion of said spool valve to said outlet passages, said spool valve being normally positioned to effect a preselected flow division through said outlet passages, a plunger located in each of said smaller bores, each of said plungers having a rod portion attached to the adjacent end of said spool valve and a radially enlarged head axially outward of said rod portion, each of said heads being slidable in one of said smaller bores for actuating said valve, a chamber located laterally adjacent each of said rod portions, each of said smaller bores having a chamber located axially outwardly of the head therein, a venturi device in each of said outlet passages sensitive to the flow rates therein, a connecting passage from a chamber adjacent one of said heads to the venturi device in the outlet passage whose entrance is located nearer said other head, another connecting passage from another chamber adjacent said one head to the outlet passage nearer said one head, another connecting passage from a chamber adjacent said other head to said other venturi device, and another connecting passage from another chamber adjacent said other head to said other outlet passage to transfer pressures generated at said venturi devices to said plungers and spool valve whereby preselected flow proportions are effected in said outlet passages.

2. The flow divider assembly set forth in claim 1 in which connecting passages provide direct communication between each of the chambers located axially outwardly of said heads and the nearer of said outlet passages and other connecting passages provide direct communication between each of the chambers located laterally adjacent said rod portions and the venturi device in the farther outlet passage.

3. The flow divider assembly set forth in claim 1 in which a connecting passage provides direct communication between a chamber located axially outwardly of one of said heads and the outlet passage nearer said head, another connecting passage provides direct communication between the chamber located axially outwardly of the other of said heads and the venturi device in said outlet passage, another connecting passage provides direct communication between a chamber located laterally adjacent one of said rod portions and the other of said venturi devices, and another connecting passage provides direct communication between the chamber located laterally adjacent the other of said rod portions and the other of said outlet passages.

References Cited

UNITED STATES PATENTS

| 1,993,790 | 3/1935 | Kinsella | 137—101 |
| 2,266,921 | 12/1941 | Trautman | 137—101 |
| 2,643,664 | 6/1953 | Willett | 137—101 |
| 2,956,577 | 10/1960 | Kirkham | 137—101 |
| 2,972,338 | 2/1961 | Lloyd | 137—85 |
| 3,195,669 | 7/1965 | Court | 137—100 |
| 3,044,480 | 7/1962 | Lee | 137—82 |

WILLIAM F. O'DEA, *Primary Examiner.*

WILLIAM H. WRIGHT, *Assistant Examiner.*

U.S. Cl. X.R.

137—625.48, 117